United States Patent Office 2,861,945
Patented Nov. 25, 1958

2,861,945

METHOD OF TREATING A SILICA-ALUMINA CRACKING CATALYST

Kenneth K. Kearby, Watchung, Isidor Kirshenbaum, Union, and Edward G. Baker, Summit, N. J., assignors to Esso Research and Engineering Company, a corporation of Delaware No Drawing. Application December 28, 1954
Serial No. 478,190

13 Claims. (Cl. 208—120)

This invention relates to a method for improving the activity of catalytic materials and more particularly to silica-alumina containing catalytic materials.

In the preparation of silica-alumina catalysts in commercial plants, sodium silicate and sulfuric acid are reacted to form silica hydrosol which gels to silica hydrogel. In previous practices the silica hydrogel was washed to remove water soluble salts such as the sulfate. Or the unwashed silica hydrogel can be impregnated with an aluminum salt such as the sulfate and then treated with ammonia to precipitate alumina on the silica hydrogel and the silica-alumina composite washed with water to remove water soluble salts. Or washed silica hydrogel can be impregnated with aluminum sulfate and the resulting mixture treated with ammonia to precipitate the alumina. The silica alumina composite is then washed with water to remove water soluble salts.

In the preparation of silica-alumina composites or gels as above generally described, water soluble salts, such as sodium sulfate, are present in the composites. Both the sodium ion and the sulfate ion are undesirable impurities in the finished silica-alumina catalyst and must be removed from the composites to form an active and selective catalyst. It is known to treat washed silica-alumina composites or gels with base exchange materials such as ammonium chloride or ammonium sulfate to remove sodium ions. Water washing treatments are used to remove sulfate ions but the sulfate ions are so tenaciously held that several washing steps are necessary and even then there is residual sulfate in the mixture. Furthermore, a disadvantage of employing several water washing steps is that alumina is removed from the composite or gel.

Residual sulfate in a silica-alumina catalyst results in permanent harm to the selectivity characteristics when using the catalyst for the cracking of hydrocarbon oils to make gasoline. This is true even though it is believed that part of the sulfate is not retained by the catalyst in plant operations. Even a small amount of the sulfate retained by the catalyst is detrimental.

It has now been found that contacting the finished catalyst with a dilute solution of a magnesium or calcium compound eliminates this harmful effect of sulfate contamination. Preferably magnesium and calcium compounds which are only slightly soluble in water are used to obtain best results but improved results are obtained with certain water soluble magnesium and calcium compounds. While the invention is not to be restricted to any theory of operation, it is believed that instead of removing the sulfate by washing or replacement, the residual sulfate is rendered inactive by reaction with the magnesium or calcium compound. The silica-alumina catalyst as received from the catalyst manufacturer is believed to contain an acidic substance, the presence of which is shown by washing the commercial catalyst with distilled water and testing the resulting water solution for its pH which varies between about 4.0 and 5.9, depending on the calcination temperature used before washing.

According to the preferred form of the invention the calcined silica-alumina catalyst is contacted with a dilute water solution of a magnesium or calcium compound in a sufficient amount to render the sulfate inactive. Or the calcined silica-alumina catalyst may be first washed with water and then as a second step treated with a dilute solution of a magnesium or calcium compound.

The silica-alumina catalyst as received from the manufacturer contained about 13% alumina and was prepared substantially as follows:

About 25 parts by weight of sodium silicate solution containing about 4 weight percent $SiO_2$ concentration were mixed with about 1 part by weight of sulfuric acid solution containing about 40% $H_2SO_4$ to form a hydrous silica which is allowed to set with agitation to form a water slurry of silica hydrogel particles. Then about 2.5 parts by weight of aluminum sulfate solution containing 20% of aluminum sulfate and about 2% free sulfuric acid were added.

Then about 0.6 part by weight of aqueous ammonia solution of about 30% ammonia concentration was added to the mixture while continuing agitation to raise the pH to about 7.0 or neutral. The ammonia precipitates the alumina on the silica hydrogel particles.

The resulting suspension or mixture was filtered and the recovered solids reslurried and spray dried. An alternate procedure is to dry the slurry at about 250° F. or higher and then grind the dry gel particles. The spray dried spheres or the ground particles were again slurried in water and then filtered and the filter cake washed with water, followed by washing with about 0.5 gallon of a 3.5% ammonium sulfate solution. Next the filter cake was washed with about 1.5 gallon of water and then with about 0.5 gallon of a 3.5% ammonium sulfate solution and then with water. The filter cake was then dried above about 250° F. The dried catalyst was calcined at about 600° F. for about 3 hours.

This commercial catalyst prepared as above described contained excess sulfate which causes partial deactivation of the catalyst when used in a catalytic cracking operation carried out at a cracking temperature of about 850° F. to about 1100° F. and about 900°–12000 F. regeneration temperature. This catalyst was washed with deionized water to a pH of about 6.6 by using about 5 parts by weight of de-ionized water to 1 part by weight of catalyst. Washing was carried out in six steps at ambient temperatures. The washed catalyst was calcined at 1000° F. for 3 hours prior to use in the cracking unit at substantially atmospheric pressure. The calcination temperature may be between about 450° F. and 1300° F., preferably between about 600° F. and 1200° F.

EXAMPLE 1

The washed and calcined catalyst was compared with the unwashed calcined catalyst as obtained from the catalyst manufacturer in a cracking operation using a fixed bed of catalyst in the form of cylindrical pills of about $3/16''$ x $3/16''$. The gas oil feed to the cracking unit was an East Texas light gas oil of the following characteristics:

ASTM distillation:
  1 B. P. _____ ° F__ 490
  5% _____ ° F__ 520
  50% _____ ° F__ 597
  90% _____ ° F__ 672
  F. B. P. _____ ° F__ 700
Aniline point _____ ° F__ 173
API gravity _____ 33.7°

The temperature during cracking was 950° F. The feed rate of gas oil was about 1.75 weight of oil per hour per weight of catalyst (w./hr./w.). The pressure was substantially atmospheric and the cycle length was 1 hour.

Table 1

| | | |
|---|---|---|
| Water Washing of Catalyst to pH=6.6 | Yes | No |
| 430° F. conversion, wt. percent | 55.0 | 49.5 |

The conversion is total conversion to products boiling below 430° F., and is expressed as wt. percent on feed.

Thus water washing of the 600° F. calcined commercial catalyst to a pH of 6.6 increased catalyst activity (430° F. wt. percent conversion) by a factor of about 10%.

EXAMPLE 2

One part by weight of the above washed catalyst was contacted with five parts of a dilute solution of basic magnesium carbonate (about 1.3 g./liter) for about 1 hour and then dried and calcined at about 1000° F. for about 3 hours. Thus the activity of the catalyst was further increased from a 430° F. conversion of 55% to at least 56.5%.

EXAMPLE 3

A commercial catalyst was water washed as described above. Another aliquot was also water washed and then was treated with a dilute basic magnesium carbonate solution. The other portion of water washed catalyst was tested without additional treatment. For treating with basic magnesium carbonate solution, one part by weight of catalyst and about 5 parts by weight of a saturated water solution of basic magnesium carbonate $(MgCO_3 \cdot Mg(OH)_2)$ was used. The solution contained about 1.3 g. of basic magnesium carbonate per liter. The temperature during treatment was ambient. The treatment consisted of pouring the basic magnesium carbonate solution over the catalyst and stirring for two hours. After standing in contact with the solution overnight, the catalyst was dried at 400° F.

Both the water washed catalyst and the catalyst treated with the basic magnesium carbonate solution were calcined at about 1200° F. for 3 hours prior to use in the cracking unit. The two catalysts were used in cracking an East Texas gas oil at 950° F. to a 60% conversion and the following results were obtained.

Table 2

| Catalyst | | Water washed commercial SiO₂Al₂O₃ Catalyst |
|---|---|---|
| Treated with basic magnesium carbonate solution Mg(OH)₂—MgCO₃* | No | Yes |
| Wt. Percent MgO on catalyst—dry basis | 0.043 | 0.20 |
| Feed rate, W./Hr./W | 0.80 | 1.64 |
| 430° F. Conversion, wt. percent | 60 | 60 |
| C₅—430° F. gasoline, vol. percent | 35.0 | 39.8 |
| C₄—430° F. gasoline, wt. percent | 41.4 | 46.2 |
| CPF | 1.0 | 0.66 |
| GPF | 1.0 | 0.89 |

*A saturated solution of basic magnesium carbonate (the salt contains about 40% MgO) was used.

The CPF is the ratio of coke or carbon produced by the treated catalyst to that produced by the washed catalyst at the same conversion.

The GPF is the ratio of dry gas (cu. ft. per barrel of oil feed) produced by the treated catalyst to the dry gas produced by washed catalyst at the same conversion.

From the above data it will be seen that the activity and selectivity of the catalyst have been improved by treating the catalyst with a dilute water solution of basic magnesium carbonate.

Instead of using the two steps of (1) water washing followed by (2) treatment with a solution of an alkaline earth metal compound, both steps can be carried out in one operation.

EXAMPLE 4

Additional data were obtained with another commercial catalyst using a dilute solution of calcium hydroxide as a contacting medium. In this case one catalyst portion was water washed as above described, and a second catalyst portion without water washing was treated with a saturated aqueous calcium hydroxide solution containing about 2 g. of calcium hydroxide per liter. About 5 parts by weight of the solution per part of catalyst were used. The contacting was done at ambient temperatures for about 2 hours, as above described for the magnesium compounds. Both catalyst portions were calcined at above 1000° F. for 3 hours before use in the cracking unit. The temperature during cracking was 950° F. and the catalyst residence time was about 1 hour. The feed was an East Texas light gas oil.

Table 3

| Catalyst | Commercial SiO₂—Al₂O₃ Catalyst Containing 0.45% SO₄ | |
|---|---|---|
| Washing medium | Water | Calcium Hydroxide Solution |
| SO₄ on catalyst, wt. percent | 0.15 | 0.15 |
| CaO on catalyst, percent ca | 0.05 | 0.70 |
| Feed Rate, W./Hr./W | 1.00 | 2.04 |
| 430° F. Conversion, wt. percent | 57 | 57 |
| C₅—430° F. gasoline, vol. percent | 33.6 | 38.6 |
| C₄—430° F. gasoline, wt. percent | 40.0 | 46.3 |
| CPF | 1.0 | 0.66 |
| GPF | 1.0 | 0.61 |

EXAMPLE 5

Data were also obtained for a catalyst which had been treated with a dilute magnesium acetate solution. The feed stock, catalyst residence time and cracking temperature were substantially the same as for the other examples above given. The commercial silica-alumina catalyst was water washed with distilled water to a pH of about 6.6 as above described. One portion of washed catalyst was treated with about 5 parts by weight of a dilute magnesium acetate solution containing about 1.5 g. of magnesium acetate per liter.

A second catalyst portion water washed as above was not treated with the magnesium acetate solution. Both catalyst portions were calcined at about 1000° F. for 3 hours before use in the cracking unit.

Table 4

| Catalyst | | Water washed commercial SiO₂Al₂O₃ Catalyst |
|---|---|---|
| Treated with magnesium acetate solution | No | Yes |
| SO₄ on catalyst, wt. percent | 0.15 | 0.18 |
| MgO on catalyst, wt. percent | 0.043 | 1.10 |
| Feed rate W./Hr./W | 1.00 | 1.40 |
| 430° F. conversion, wt. percent | 57 | 57 |
| C₅—430° F. gasoline, vol. percent | 33.6 | 36.8 |
| C₄—430° F. gasoline, wt. percent | 40.0 | 43.8 |
| CPF | 1.0 | 0.85 |
| GPF | 1.0 | 0.77 |

From the above data it is apparent that the effect of the aqueous solutions containing magnesium or calcium compounds is one of neutralizing the action of the sulfate present, without removing it, and it is believed that this reaction changes the catalyst micro-structure to give an increase in activity and improved selectivity which sulfate removal by heat alone does not accomplish.

Further it has been shown that if silica-alumina catalysts containing substantially no sulfate or less than about 0.075% SO₄ by weight are treated with dilute solutions of alkaline earth metal ions according to the present invention, the selectivity and activity are substantially unaffected. Our invention is particularly effective for catalysts containing between 0.15% and 1% sulfate, the maximum benefits usually occurring when the catalyst contains between 0.15–0.7% sulfate. Above this range excessive alkaline earth metal may be introduced into the catalyst with resultant lowering of catalyst activity. Much below this range, improvement is less significant.

The present invention may be applied with advantage to hydrocracking catalysts, other cracking catalysts, hydroforming catalysts, etc., using a silica alumina or other cracking catalyst as base.

In actual practice it is not necessary to calcine the silica-alumina catalyst after water washing or treatment with the solutions of magnesium or calcium compounds before using the treated catalyst in a cracking unit as the catalyst will be calcined in use by the temperatures prevailing during regeneration.

The amount of water used for washing the calcined catalyst as obtained from the catalyst manufacturer may vary between about 3 and 10 parts by weight to 1 part by weight of catalyst and the time of washing may vary between less than 1 and 16 hours, preferably about 2–5 hours. Although not necessary, deionized water is preferred.

The amount of basic magnesium carbonate or calcium hydroxide or magnesium acetate or nitrate used in the solutions for treating a silica-alumina catalyst is preferably in the range of 1 to 3 g./liter and the amounts of water solution may vary between about 3 and 10 parts by weight to 1 part by weight of catalyst. Caution is necessary to avoid introduction of large amounts of Ca or Mg into the catalyst. This reduces catalyst activity. Other alkaline earth metal salts having some water solubility may be used in very dilute solution, taking the precaution outlined above. Water soluble salts of calcium such as the acetate and nitrate may be used in very dilute solutions.

From the above data it will be apparent that an improved catalyst is obtained when using applicants' process for treating catalysts containing sulfate.

EXAMPLE 6

Data have been obtained on an essentially sulfate-free silica-alumina catalyst which show that when sulfate is absent from the cracking catalyst, contact with dilute solutions of alkaline earth metal ions shows no benefits. Catalyst selectivity and activity appear substantially unaffected by the treatment. Data are given in the following table for a low sulfate cracking catalyst, containing about 0.06% sulfate, 13% alumina and the balance substantially silica.

The amount of alkaline earth metal solution, the dilution of the solution and the time of treatment were substantially the same as given above in the other examples.

Table 5

| Catalyst | Control | Ca(OH$_2$) Treated |
|---|---|---|
| CaO on catalyst, wt. percent | 0.02 | 0.66 |
| SO$_4$ on catalyst, wt. percent | 0.06 | 0.03 |
| Temp., °F | 930 | 930 |
| Feed rate W./Hr./W | 1.5 | 1.5 |
| 430° F. Conversion, wt. percent | 57 | 57 |
| C$_5$—430° F. gaso'line, vol. percent | 37.0 | 37.5 |
| C$_4$—430° F. gasoline, wt. percent | 45.5 | 45.5 |
| CPF | 1.0 | 1.0 |
| GPF | 1.0 | 1.0 |
| C$_5$+ Gasoline, research octane No., clear | 94 | 94 |

These data emphasize the fact that the improvements obtained by treating the cracking catalyst according to this invention are due to an inactivation of the residual sulfate. In the absence of sulfate no advantages are observed. In the presence of sulfate, increased activity, improved selectivity to gasoline and less coke and gas are formed by the treatment taught by this invention and also the catalysts of this invention produce higher octane number gasoline than do catalysts not so treated.

EXAMPLE 7

The teachings of this invention may also be applied to other cracking catalysts. For example, a catalyst containing about 40% Al$_2$O$_3$ and the remainder silica was made by reacting sodium silicate and sodium aluminate solutions. After washing, the catalyst was dried at 400° F. and calcined at 1000° F. and found to contain about 0.4% SO$_4$. Aliquots of the catalyst were treated with dilute Ca(OH)$_2$ and Mg(NO$_3$)$_2$ solutions. The calcium hydroxide solution contained about 2 g. of Ca(OH)$_2$ per liter and the magnesium nitrate solution contained about 1.5 g. of Mg(NO$_3$)$_2$ per liter. The treated catalysts produced more gasoline by a factor of 7–10%, the Ca(OH)$_2$ treated catalyst being superior to the Mg(NO$_3$)$_2$. It was also noted that if the calcined catalyst was water washed as in Example 1, activity was increased by 20% and higher gasoline yields were obtained. It has been found that treating catalysts in accordance with this invention results in improvement without removal of soda contamination, again emphasizing the role inactivation of sulfate plays.

The catalyst treated according to the present invention may be used as a finely divided or powdered catalyst in fluid cracking units, as granular catalyst or as pills in the fixed bed or moving bed cracking processes, as finely divided catalyst in suspensoid units etc.

What is claimed is:

1. A method of improving the activity of fresh previously calcined silica-alumina catalyst containing a major proportion of silica and a minor proportion of alumina and prepared from solutions of sodium silicate and sulfuric acid and an aluminum compound and ammonia which comprises contacting the silica-alumina catalyst with water for an extended period of time to reduce the pH of the catalyst and then treating the washed silica-alumina catalyst with a saturated aqueous solution of a basic magnesium carbonate for an extended period of time, and then drying and calcining the washed and treated catalyst.

2. A method of improving the activity of fresh previously calcined silica-alumina catalyst containing not more than about 40% alumina and prepared from solutions of sodium silicate and sulfuric acid and an aluminum compound and ammonia which comprises contacting the fresh silica-alumina catalyst with water for an extended period of time to reduce the pH of the catalyst and then treating the washed silica-alumina catalyst with a concentrated aqueous solution of calcium hydroxide for an extended period of time and then drying and calcining the washed and treated catalyst.

3. A method of improving the activity of fresh previously calcined silica-alumina catalyst containing detrimental sulfate and a major proportion of silica and a minor proportion of alumina and prepared from aqueous solutions of sodium silicate, sulfuric acid, an aluminum compound and ammonia, which comprises treating the fresh silica-alumina catalyst with a concentrated aqueous solution of calcium hydroxide containing about 2 grams per liter of calcium hydroxide and using about 5 parts by weight of the calcium hydroxide solution to one part by weight of the catalyst and continuing the treating for about 2 hours at ambient temperature and then drying and calcining the treated catalyst at about 1000° F. for about 3 hours.

4. A method of improving the activity of fresh previously calcined silica-alumina catalyst containing detrimental sulfate in an amount of at least 0.15% by weight of the catalyst on a dry basis and a major proportion of silica and a minor proportion of alumina and prepared from aqueous solutions of sodium silicate, sulfuric acid, an aluminum compound and ammonia, which comprises treating the fresh silica-alumina catalyst with an aqueous solution of an alkaline earth metal compound selected from the group consisting of calcium compounds and magnesium compounds and continuing the treating for an extended period of time at ambient temperature and then drying and calcining the treated catalyst.

5. A method according to claim 4 wherein the alkaline earth metal compound comprises an acetate.

6. A method according to claim 4 wherein the alkaline earth metal compound comprises a nitrate.

7. A method of improving the activity of fresh previously calcined silica-alumina catalyst containing detrimental sulfate in an amount between about 0.15% and 1% of the catalyst and a major proportion of silica and a minor proportion of alumina and prepared from aqueous solutions of sodium silicate, sulfuric acid, an aluminum compound and ammonia, which comprises treating the fresh silica-alumina catalyst with an aqueous solution containing up to about 3 grams per liter of an alkaline earth metal compound and continuing the treating for about an extended period of time at ambient temperature and then drying and calcining the treated catalyst.

8. A method according to claim 7 wherein said alkaline earth metal compound comprises a basic magnesium carbonate.

9. A method according to claim 7 wherein said alkaline earth metal compound comprises calcium hydroxide.

10. A method of improving the activity of fresh previously calcined silica-alumina catalyst containing detrimental sulfate and a major proportion of silica and a minor proportion of alumina and prepared from sodium silicate, sulfuric acid, an aluminum compound and ammonia, which comprises treating the fresh catalyst with an aqueous solution of an alkaline earth metal compound selected from the group consisting of calcium compounds and magnesium compounds and containing about 1 to 3 g./l. of the compound and the amount of solution used being between about 3 and 10 parts by weight to about 1 part by weight of catalyst, continuing the treatment for about 2 hours and then drying and calcining the treated catalyst for about 3 hours at about 1000° F.

11. A method according to claim 10 where the fresh silica-alumina catalyst is water washed for 1 to 5 hours before being treated with the alkaline earth metal compound.

12. A method of improving the activity of fresh previously calcined silica-alumina catalyst containing detrimental sulfate and a major proportion of silica and a minor proportion of alumina and prepared from sodium silicate, sulfuric acid, an aluminum compound and ammonia, which comprises treating the fresh catalyst with an aqueous solution of an alkaline earth metal compound selected from the group consisting of calcium and magnesium compounds and containing about 1 to 3 g./l. of the compound and the amount of solution used being between about 3 and 10 parts by weight to 1 part by weight of catalyst, continuing the treatment for an extended period of time and then drying and calcining the treated catalyst.

13. A process for the catalytic cracking of hydrocarbons to produce gasoline which comprises contacting relatively high boiling hydrocarbons at a cracking temperature with a fresh previously calcined silica-alumina catalyst containing a major proportion of silica and a minor proportion of alumina and prepared from sodium silicate, sulfuric acid, an aluminum compound and ammonia, which catalyst has been treated with an aqueous solution of an alkaline earth metal compound selected from the group consisting of calcium and magnesium compounds for an extended period of time and then dried and calcined to deactivate detrimental sulfate contained in said fresh previously calcined silica-alumina catalyst.

References Cited in the file of this patent

UNITED STATES PATENTS

| | | |
|---|---|---|
| 2,302,297 | Connolly | Nov. 17, 1942 |
| 2,348,647 | Reeves | May 9, 1944 |
| 2,414,736 | Gray | Jan. 21, 1947 |
| 2,472,834 | Schexnailder et al. | June 14, 1949 |
| 2,540,689 | Porret | Feb. 6, 1951 |
| 2,638,453 | Starr et al. | May 12, 1953 |
| 2,669,547 | Shabaker | Feb. 16, 1954 |